US007267613B2

(12) United States Patent
Cole

(10) Patent No.: US 7,267,613 B2
(45) Date of Patent: Sep. 11, 2007

(54) SLANT-TYPE GAMING MACHINE

(75) Inventor: Joseph W. Cole, Las Vegas, NV (US)

(73) Assignee: Cole Industries, Inc., North Las Vegas, NV (US)

(*) Notice: Subject to any disclaimer, the term of this patent is extended or adjusted under 35 U.S.C. 154(b) by 178 days.

(21) Appl. No.: 10/661,853

(22) Filed: Sep. 12, 2003

(65) Prior Publication Data

US 2005/0026702 A1 Feb. 3, 2005

Related U.S. Application Data

(63) Continuation-in-part of application No. 10/621,740, filed on Jul. 17, 2003.

(51) Int. Cl.
*A63F 13/00* (2006.01)

(52) U.S. Cl. ............................ 463/20; 463/46; 463/36

(58) Field of Classification Search .................. 463/36, 463/46, 11, 20, 47; 273/143 R, 148 R, 138.1, 273/138.2; 345/156; 400/691; D21/37, D21/369, 370, 327, 38; 194/350; 248/674–676, 248/27.1, 27.3, 124.1, 917–24, 346.6, 317, 248/118; 108/32, 52.1, 145; 348/794, 836; 361/682–684, 724–727, 823; 312/7.2, 223, 312/257, 246

See application file for complete search history.

(56) References Cited

U.S. PATENT DOCUMENTS

| | | | | |
|---|---|---|---|---|
| 3,940,136 | A * | 2/1976 | Runte | 463/3 |
| 4,084,194 | A | 4/1978 | Hector | |
| 4,314,336 | A | 2/1982 | Bernstein et al. | |
| 4,363,486 | A | 12/1982 | Chaudhry et al. | |
| 4,440,457 | A | 4/1984 | Fogelman et al. | |
| D276,630 | S | 12/1984 | Gimbel | |
| 4,614,342 | A * | 9/1986 | Takashima | 463/11 |
| 4,689,742 | A | 8/1987 | Troy et al. | |
| 4,856,787 | A | 8/1989 | Itkis | |
| 4,889,339 | A | 12/1989 | Okada | |
| 4,972,296 | A * | 11/1990 | Chu | 361/725 |
| D312,666 | S | 12/1990 | Lempke et al. | |
| 5,046,735 | A | 9/1991 | Hamano et al. | |
| 5,083,271 | A | 1/1992 | Thacher et al. | |
| 5,110,129 | A | 5/1992 | Alvarez | |
| 5,113,990 | A | 5/1992 | Gabrius et al. | |

(Continued)

FOREIGN PATENT DOCUMENTS

| | | |
|---|---|---|
| GB | 2072395 | 9/1981 |

(Continued)

*Primary Examiner*—Ronald Laneau
*Assistant Examiner*—Omkar A. Deodhar
(74) *Attorney, Agent, or Firm*—Weide & Miller, Ltd.

(57) ABSTRACT

The invention comprises various gaming machine features and a slant-top type gaming machine. In one embodiment, a cabinet has a play area between an upwardly extending console and a supporting base portion. The console has an opening. A display and bezel are movable mounted to the console, blocking the opening in one position and allowing access to the opening in another. A game controller in the cabinet is accessible through the opening. The controller is mounted on a movable platform, allowing the controller to be moved into alignment with the opening. A ticket printer is located in the cabinet and expels tickets into a coin tray. Access doors provide access to a storage area defined by the supporting base portion.

10 Claims, 4 Drawing Sheets

U.S. PATENT DOCUMENTS

| | | | | |
|---|---|---|---|---|
| D333,164 | S | 2/1993 | Kraft et al. | |
| 5,259,613 | A | 11/1993 | Marnell, II | |
| D344,926 | S * | 3/1994 | Alexandres et al. | D21/37 |
| 5,326,104 | A | 7/1994 | Pease et al. | |
| 5,351,176 | A * | 9/1994 | Smith et al. | 361/681 |
| D351,869 | S * | 10/1994 | Rothschild et al. | D21/37 |
| 5,388,032 | A * | 2/1995 | Gill et al. | 700/17 |
| 5,393,057 | A | 2/1995 | Marnell, II | |
| 5,431,492 | A * | 7/1995 | Rothschild et al. | 312/229 |
| 5,457,306 | A | 10/1995 | Lucero | |
| 5,509,655 | A | 4/1996 | Ugawa | |
| D373,809 | S | 9/1996 | Hirato | |
| 5,560,603 | A | 10/1996 | Seelig et al. | |
| 5,586,936 | A * | 12/1996 | Bennett et al. | 463/25 |
| 5,611,730 | A | 3/1997 | Weiss | |
| 5,636,101 | A * | 6/1997 | Bonsall et al. | 361/681 |
| 5,639,088 | A | 6/1997 | Schneider et al. | |
| 5,647,798 | A | 7/1997 | Falcigial | |
| D383,171 | S | 9/1997 | Hanscom | |
| 5,676,231 | A | 10/1997 | Legras et al. | |
| 5,695,402 | A | 12/1997 | Stupak | |
| D388,835 | S | 1/1998 | Yamaguchi | |
| D396,898 | S | 8/1998 | Tsuda | |
| 5,807,177 | A | 9/1998 | Takemoto et al. | |
| 5,813,914 | A * | 9/1998 | McKay et al. | 463/46 |
| 5,825,613 | A * | 10/1998 | Holden | 361/681 |
| 5,826,882 | A | 10/1998 | Ward | |
| D400,597 | S * | 11/1998 | Hedrick et al. | D21/38 |
| D406,612 | S * | 3/1999 | Johnson | D21/327 |
| 5,949,643 | A | 9/1999 | Batio | |
| 5,951,397 | A * | 9/1999 | Dickinson | 463/36 |
| 6,033,307 | A | 3/2000 | Vancura | |
| 6,039,422 | A * | 3/2000 | Butters et al. | 312/334.1 |
| D424,122 | S | 5/2000 | Dickenson et al. | |
| D428,062 | S | 7/2000 | Hayashi | |
| 6,105,962 | A | 8/2000 | Malavazos et al. | |
| 6,110,041 | A | 8/2000 | Walker et al. | |
| 6,116,597 | A | 9/2000 | Rowe et al. | |
| 6,135,884 | A | 10/2000 | Hedrick et al. | |
| 6,138,814 | A * | 10/2000 | Miller et al. | 194/350 |
| 6,161,488 | A * | 12/2000 | Reddicliffe | 108/69 |
| 6,161,805 | A * | 12/2000 | Wells | 248/118 |
| 6,164,645 | A * | 12/2000 | Weiss | 273/138.2 |
| 6,201,532 | B1 * | 3/2001 | Tode et al. | 345/156 |
| 6,201,703 | B1 | 3/2001 | Yamada et al. | |
| D439,931 | S | 4/2001 | Yamaguchi | |
| 6,219,228 | B1 * | 4/2001 | Sun | 361/683 |
| 6,289,326 | B1 * | 9/2001 | LaFleur | 312/258 |
| 6,290,229 | B1 * | 9/2001 | Perez | 273/148 R |
| 6,334,612 | B1 * | 1/2002 | Wurz et al. | 273/143 R |
| 6,340,145 | B1 * | 1/2002 | Tagami et al. | 248/317 |
| D456,855 | S * | 5/2002 | Hedrick et al. | D21/369 |
| 6,402,111 | B1 * | 6/2002 | Stewart et al. | 248/317 |
| D460,496 | S | 7/2002 | Cole | |
| 6,445,576 | B1 * | 9/2002 | Wooden et al. | 361/683 |
| 6,460,817 | B1 * | 10/2002 | Bosson | 248/317 |
| 6,559,829 | B1 * | 5/2003 | Matsuo et al. | 248/918 |
| 6,560,093 | B1 * | 5/2003 | McLeod et al. | 361/681 |
| 6,560,094 | B2 * | 5/2003 | Schmidt | 361/681 |
| 6,572,204 | B1 * | 6/2003 | Hedrick et al. | 312/223.1 |
| 6,578,847 | B1 * | 6/2003 | Hedrick et al. | 273/138.2 |
| 6,623,006 | B2 * | 9/2003 | Weiss | 273/138.2 |
| 6,641,484 | B2 * | 11/2003 | Oles et al. | 463/47 |
| 6,688,518 | B1 * | 2/2004 | Valencia et al. | 235/379 |
| 6,688,984 | B2 * | 2/2004 | Cole | 463/46 |
| 6,699,128 | B1 * | 3/2004 | Beadell et al. | 463/46 |
| 6,702,409 | B2 * | 3/2004 | Hedrick et al. | 312/223.1 |
| 6,802,575 | B1 * | 10/2004 | Lee | 312/7.2 |
| D498,268 | S * | 11/2004 | Kaminkow et al. | D21/370 |
| 6,814,518 | B2 * | 11/2004 | Luciano et al. | 400/691 |
| 6,820,875 | B1 * | 11/2004 | Hedrick et al. | 273/138.1 |
| 6,860,814 | B2 | 3/2005 | Cole | |
| 2002/0006828 | A1 * | 1/2002 | Gerding | 463/46 |
| 2002/0079790 | A1 * | 6/2002 | Qiu | 312/223.2 |
| 2002/0163776 | A1 * | 11/2002 | Thompson et al. | 361/681 |

FOREIGN PATENT DOCUMENTS

| | | |
|---|---|---|
| GB | 2084371 | 4/1982 |
| GB | 2096376 | 10/1982 |
| GB | 2201821 | 9/1988 |
| JP | 05-068745 | 3/1993 |
| JP | 10-052525 | 2/1998 |
| JP | 11-239659 | 9/1999 |

* cited by examiner

SLANT-TYPE GAMING MACHINE

RELATED APPLICATIONS

This application is a continuation-in-part of U.S. application Ser. No. 10/621,740 filed Jul. 17, 2003, which is incorporated herein in its entirety.

FIELD OF THE INVENTION

The present invention relates to gaming machines, and more particularly to a configuration of a slant-top type gaming machine.

BACKGROUND OF THE INVENTION

Gaming machines have a wide variety of configurations. One common gaming machine configuration is referred to as the “upright” configuration. The upright gaming machine is generally configured to set upon a stand or cabinet. The gaming machine extends upwardly, and is generally tall and narrow. The front of the upright gaming machine generally comprises a door. Input buttons are located on the door, and reels or a video display are mounted behind the door in a cabinet. Due to its height and/or positioning on a stand, a player generally stands in front of the upright gaming machine, or sits on a tall stool.

Another gaming machine configuration is referred to as a “slant top.” This gaming machine is generally free standing, having a lower supporting section and a top display portion. Generally, the top portion includes a sloping or slanted section where player input buttons and the reels or video display are located. This section is generally positioned at a distance above the ground permitting a player to sit in a chair and slide their legs thereunder.

The slant top gaming machine has a number of advantages, but also a great number of drawbacks. The primary advantage to the slant top is that it accommodates a seated player, in much the same fashion as a gaming table. This is convenient and comfortable for the player. The slant top also generally has an outwardly extending section which allows the user to rest their arms as well as place drinks and other items.

One disadvantage to the slant top gaming machine is that it is generally very large in dimension. This means that a lesser number of these machines can be placed on the same gaming or casino floor space. In addition, it is often difficult to access the components of the slant top gaming machine. Unlike the upright gaming machine, the slant top gaming machine does not include a main front door which can be opened to provide access to the internal components. Instead, the fixed support and display portions of the slant top generally enclose these components, making access to them very difficult.

An improved configuration of a slant top gaming machine is desired.

SUMMARY OF THE INVENTION

The invention comprises various gaming machine features and various embodiments of a slant-top type gaming machine.

In one embodiment, the gaming machine comprises a cabinet. The cabinet includes a base or storage area, an upwardly extending console, and a play area generally located between the base and the console. In a preferred embodiment, the play area extends outwardly beyond the base or storage area, permitting a player to place their legs underneath when they are in a seated position.

In one embodiment, the console includes at least one display for displaying game information. The display selectively covers an opening in the console leading to an interior area of the cabinet. The display is mounted for rotation between a first position in which it covers the opening and a second position in which at least part of the display is positioned outwardly of the console, permitting access to the opening.

In one embodiment, the display is mounted between a bezel and the console. The bezel is movable independent of the display.

A game controller is mounted within the cabinet. In one embodiment, the game controller is mounted to a controller platform. The platform is mounted for movement. In one position, a base portion which supports the game controller is generally horizontal. In another position, the base portion is tilted forwardly, generally aligning the game controller with the opening in the console.

In one embodiment, the gaming machine includes a ticket or coupon printer. The printer is located in the cabinet. Access is provided to the printer via an opening in the play area. Generally, this opening is obscured by a button panel mounted to the cabinet. The button panel rotates into a position which the opening is accessible. The ticket printer dispenses tickets through a slot leading to a tray located in the play area.

In one embodiment, coins are also delivered to the tray. The coins may be delivered from a coin hopper located in the cabinet. The gaming machine preferably includes a coin acceptor for accepting coins as wagers, the accepted coins delivered to the coin hopper.

The gaming machine includes a bill validator/receipt acceptor. The bills or receipts are accepted into a slot, read by the validator, and then stored in a cash box. In one embodiment, the cash box is contained in a lockable compartment in the console.

In one embodiment the storage area is accessible via one or more access doors or panels. The doors preferably raise upwardly. In one embodiment, after being raised upwardly, the doors slide into the cabinet. The access doors are all lockable, controlling access to the interior of the cabinet.

The gaming includes a player tracking device. In one embodiment, a card reader and keypad of the device are conveniently located in a bumper portion located at the front of the play area.

Further objects, features, and advantages of the present invention over the prior art will become apparent from the detailed description of the drawings which follows, when considered with the attached figures.

DETAILED DESCRIPTION OF THE INVENTION

Figure 2:
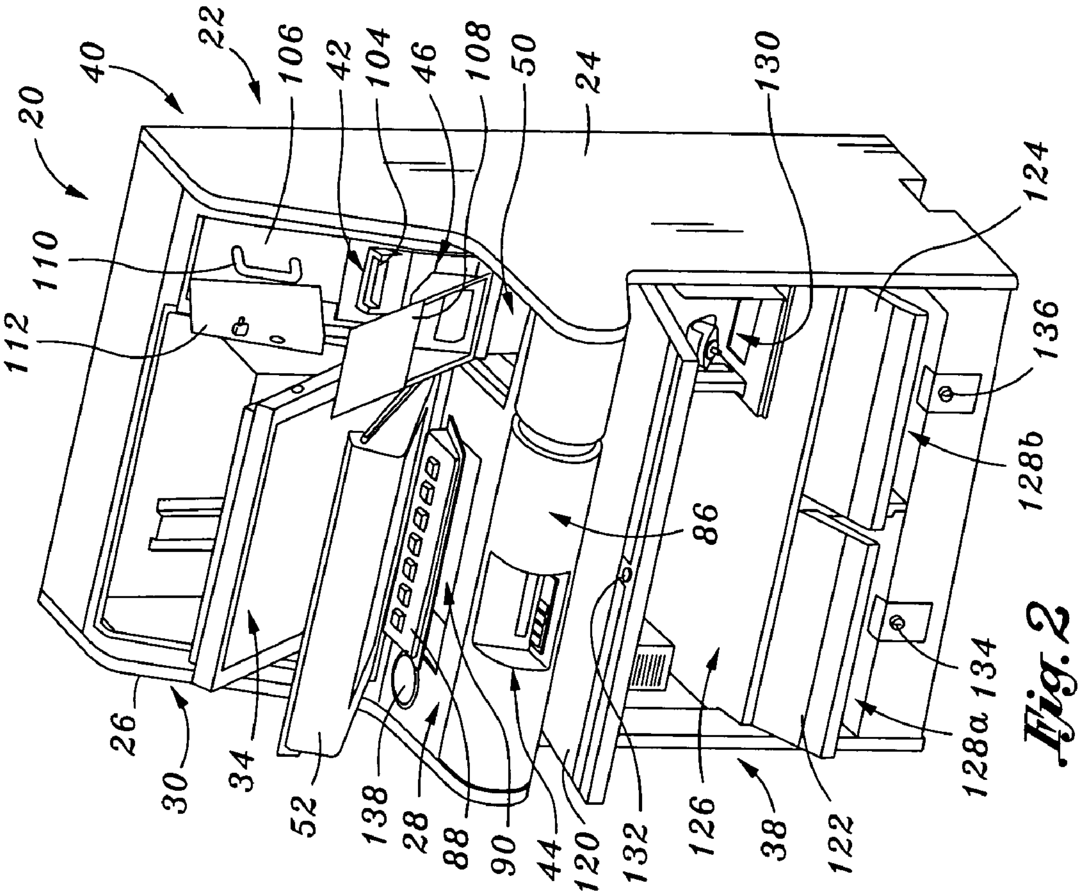
FIG. 2 illustrates the gaming machine of FIG. 1 with the bezel, display, bill validator cover and access panels in a second position.

The invention is a configuration of and method of using a gaming machine. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a gaming machine. In a preferred embodiment, the gaming machine is of a "slant top" configuration. The invention includes a number of features, one or more of which are applicable to gaming machines other than that described and illustrated herein, including gaming machines having other configurations, such as "upright" type gaming machines.

One embodiment of a gaming machine 20 in accordance with the present invention will be described with reference to FIG. 1. The gaming machine 20 includes a cabinet 22. In general, the cabinet 22 comprises a support structure for other elements of the gaming machine 20.

As illustrated, the cabinet 22 comprises a first end support 24 and a second end support 26. In general, each of these supports 24,26 comprises a panel member serving to provide support and enclosure functions. The first and second end supports 24,26 are located opposite one another at each side or end of the gaming machine 20.

Moving from bottom to top, between the first and second end supports 24,26, the cabinet 22 generally defines a base, support or storage area 38, a play surface or area 28, and a console 30.

The play surface or area 28 is defined between the first and second end supports 24,26 generally above the base or storage area 38, but below the console 30. Preferably, the play surface 28 is an outwardly extending, generally horizontal surface. The play area 28 may have a variety of dimensions.

As illustrated, the first and second end supports 24,26 include "arm" portions which extend outwardly generally horizontally from a main upright section. Corresponding arm portions of the first and second end supports 24,26 aid in supporting and defining the play area 28. In one embodiment, the top surface of the play area 28 is about 30 inches above the bottom of the gaming machine 20 (and thus a support surface on which the machine rests), and the arm portions are no less than about 24 inches above the bottom of the gaming machine.

The console 30 extends upwardly above the play surface 28 of the play area of the gaming machine 20. As illustrated, the console 30 extends between the first end support 24 and the second end support 26. The console 30 includes a face 32 which is oriented towards the play surface 28. In one embodiment, the face 32 extends upwardly at an angle of approximately 20 degrees from vertical (i.e. nearly, but not quite vertical). Preferably, the console 30 has a generally enclosed interior area in which one or more components of the gaming machine 20 are located, as described in more detail below.

A display 34 is associated the console 30. In one or more embodiments, the display 34 comprises a generally thin or flat display, such as an LCD type display. The display 34 may be of a variety of other types, such as CRT, plasma or the like. As described below, the use of generally thin or flat displays contributes to the gaming machine 20 having a generally narrow profile, resulting in a number of advantages. As described in more detail below, the display 34 is capable of displaying information to a player.

Below the play surface 28 is the storage portion or area 38 of the game station 20. The storage area 38 also defines an interior space in which various equipment and items may be stored, as described below.

In one embodiment, a rear portion of the console 30 and the storage area 38 is defined and enclosed by a rear wall 40. In one embodiment, the rear wall 40 is a generally planar vertically extending member which encloses the rear or back of the gaming machine 20. As described below, a front of the storage area 38 opposite the rear wall 40 is generally defined by a plurality of access panels.

Preferably, the depth (i.e. the distance from the front thereof to the rear wall 40) of the storage area 38 of the gaming machine 20 is less than the depth of the gaming machine 20 at the play surface 28. In this manner, as described in more detail below, the play surface 28 of the gaming machine 20 conveniently extends outwardly towards a player using the station, with the storage area 38 recessed inwardly there below, accommodating the players legs extending under the play area 28.

In the preferred embodiment of the invention, one or more of the games presented for play are of the type which requires a player to place a wager to participate, and if the result of the game presented is one of one or more predetermined winning outcomes, results in an award to the player. Thus, in one or more embodiments, the gaming machine 20 includes means for accepting a wager. In one embodiment, the means includes or comprises a bill validator 42. The bill validator 42 is adapted to accept paper currency (such as U.S. currency) and/or coupons. The bill validator 42 includes a slot 104, as described in more detail below, through which the paper currency may be passed. As is well known, the bill validator 42 is arranged to determine (such as by optical comparison) if a presented paper bill is authentic. If not, then the currency is rejected. If so, then the bill or currency is preferably routed to a currency stacker (not shown) or other currency storage device.

In one embodiment, a player tracking device 44 is provided. In one embodiment, the player tracking device 44 includes a card reader for reading a player card, and a keypad for receiving player input. Such a card may include information facilitating a player providing the necessary credit(s) for playing the game. The card may include a magnetic stripe, bar-code or other element which represents value, such as a number of credits and their value. Alternatively, the element(s) may comprise a code which is utilized to access information regarding value belonging to the player. For example, the gaming machine 20 or a remote database may include information regarding credits belonging to a player which may be accessed and played by a player, the player credit information identifiable by the code associated with the card.

In one or more embodiments, the gaming machine 20 includes a coin acceptor 46 for accepting coins provided by a player. Such a coin acceptor 46 may include a comparitor for determining the authenticity and value of the presented coin, and a coin hopper or other device for storing accepted coins. This coin hopper may also be used for dispensing coins.

Means are preferably provided allowing a player to place a bet from the credits provided by the player and to accept other player input, such as player instructions such as "hold" and "spin.". As illustrated, this preferably includes or comprises a plurality of input buttons 48.

In the event a player is determined to be the winner of a particular game or games, then the player may be awarded winnings. In one embodiment, the winnings are paid in the form of credits. The credits may be used by the player to play additional games on the gaming machine 20, or may be "cashed in" by the player. For example, the player may obtain payment in the form of coins and/or currency by the game operator for those credits belonging to the player. In one embodiment, credits won by a player may be stored on the player's tracking card. Alternatively, the credit information may be stored at the gaming machine 20 or at a remote location, such as a remote database.

Winnings may also be paid in the form of coins. These coins may be paid from a coin hopper to a coin tray 50 accessible by the player. Coins may be provided to a coin hopper, as described in more detail below, via a coin accepting device by which a player provides coins for credits to play the game. Such an arrangement is well known in the art.

In one or more embodiments, a printer (described in more detail) is provided for printing receipts. The printer may be of a variety of types, such as thermal, or laser or ink deposition. Preferably, the printer is adapted to print information on a paper or other ticket element. In one embodiment, the printer is arranged to be controlled by the gaming controller and print credit or other information. Such a receipt may be coded or include human-readable information. The receipt may represent value and be used by a player to obtain, in exchange, currency and/or coins or may be used at another gaming machine as value/credits for game play (such as by input into the bill validator/coupon reader). The receipt may also provide game play information, such as a unique identification number for a stored game in a system which permits a player to cease play of a game and continue the play of the game at a later time.

Aspects of the various components of the gaming machine 20, including their location and assembly, will now be described in more detail.

As described above generally, the display 34 is associated with the front face 32 of the upwardly extending console 30. Preferably, the display 34 is mounted for movement. In one embodiment, the display 34 is movable between a first, viewing position, and a second, access position. The display 34 is illustrated in its viewing position in FIG. 1. The display 34 is mounted in its access position in FIG. 2. In its access position, the display 34 is rotated forward away from the face 32 of the console 30.

In a preferred embodiment, the display 34 is mounted behind a bezel 52. The bezel 52 preferably defines an opening through which the display 34 may be viewed, the bezel 52 comprising a frame.

In a preferred embodiment, the bezel 52 is hingedly mounted to the cabinet 22 at a lower portion thereof. As illustrated in FIGS. 1 and 2, this permits the bezel 52 to be moved from a first position in which it rests against the face 32 of the console 30 and a second position in which it is rotated forward from the face 32 of the console 30.

Figure 4:
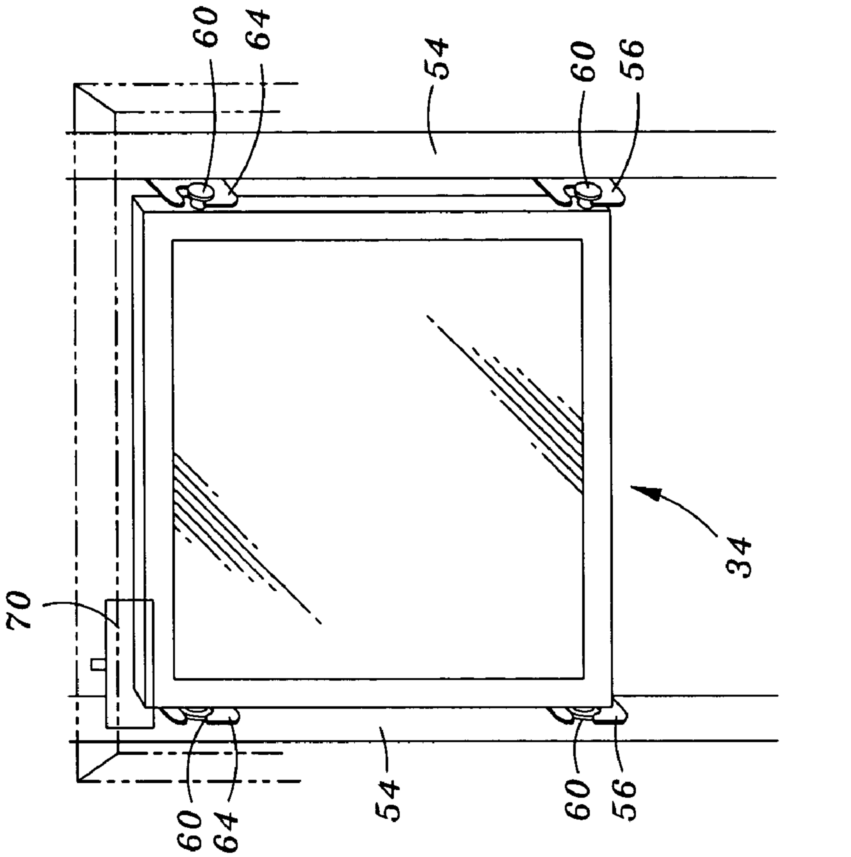
FIG. 4 illustrates the display of FIG. 3 in a second position.
Figure 3:
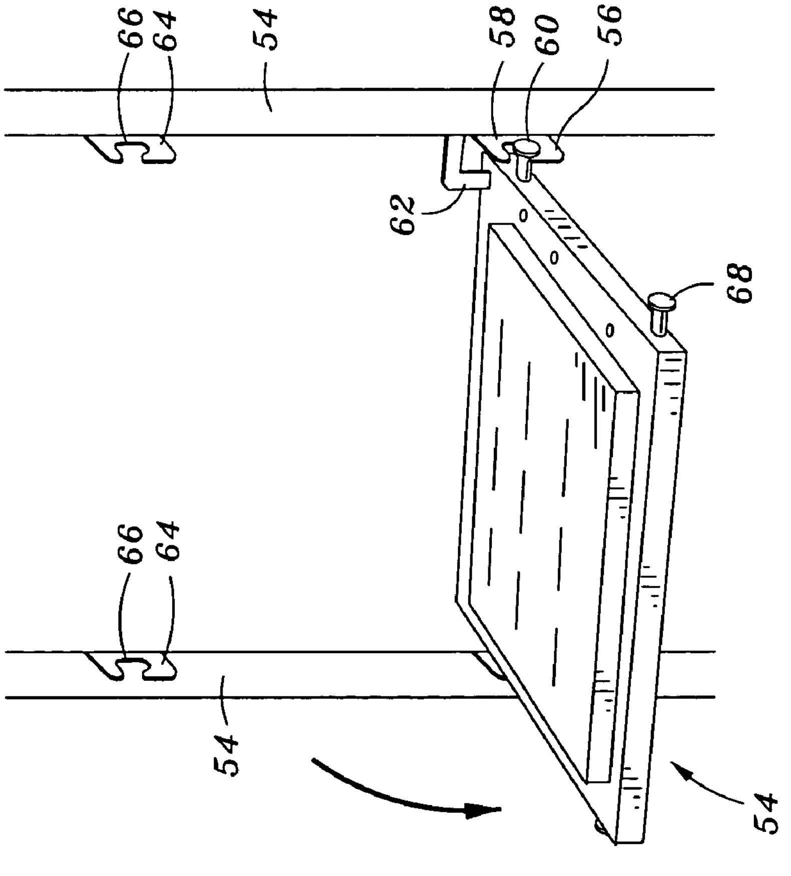
FIG. 3 illustrates a display mount in accordance with one embodiment of the invention and further illustrates a display mounted to the display mount in a first position.

Referring to FIG. 2, the display 34 is mounted behind the bezel 52. In one embodiment, the display 34 has a display area and a surrounding frame. In a preferred embodiment, the frame is mounted for rotation relative to the cabinet 22. One method of mounting is illustrated in FIGS. 3 and 4. As illustrated therein, a support member 54 is located on either side of the opening in the face 32 of the console 30.

In one embodiment, a flange 56 extends from each support member 54 near the bottom of the opening in the console 30. Each flange 56 includes a slot 58 for accepting a pin 60 which extends outwardly from the frame of the display 34. In this configuration, the pin 60 is permitted to rotate within the slot 58.

Forward rotation of the display 34 is preferably limited by a stop 62. As illustrated, in one embodiment, the stop 62 comprises an "L" shaped member which extends from one of the supports 54. The stop 62 is positioned so that when the display 34 is rotated forward to a predetermined position, a bottom portion of the frame of the display 34 engages the stop 62, preventing further forward rotation.

Additional details of such a display 34 mount are provided in U.S. application Ser. No. 10/621,740 which is incorporated herein in its entirety.

In one embodiment, means are provided for maintaining the display 34 in its first, viewing position. In one embodiment, a second flange 64 extends from each support member 54 near a top of the opening in the console 30. The second flanges 64 include a slot 66 for accepting another pin 68 extending from the frame of the display 34.

In addition, referring to FIG. 4, a second stop 70 is provided. The second stop 70 is preferably mounted for rotation between a first position in which it extends in front of a portion of the frame of the display 34, and a second position in which it does not obstruct forward rotation of the display 34. As illustrated, the second stop 70 is mounted for rotation to the console 30.

In use, the second stop 70 is moved away from the display 34. The display 34 may then be moved upwardly until the pins 68 extending from the display 34 are removed from the slots 58, allowing the display 34 to be rotated about the bottom pins 60.

Advantageously, when the bezel 52 and display 34 are rotated forward, the opening in the console 30 is accessible, permitting access into the interior area of the cabinet 22. In a preferred embodiment, referring to FIG. 5, a game controller 72 is located in the cabinet 22 and is accessible via the opening in the console 30. In a preferred embodiment, the game controller 72 is generally located behind the display 34. In general, the game controller 72 preferably comprises a device for generating and/or transmitting data, such as data used by the display to display game information, and for accepting data, such as input signals from the buttons 48. The gaming controller 72 may have a wide variety of configurations, such as comprising a computing device or a simple communication device, and may be associated with one or more outside devices, such as by connection to a wired or wireless network.

Figure 6:
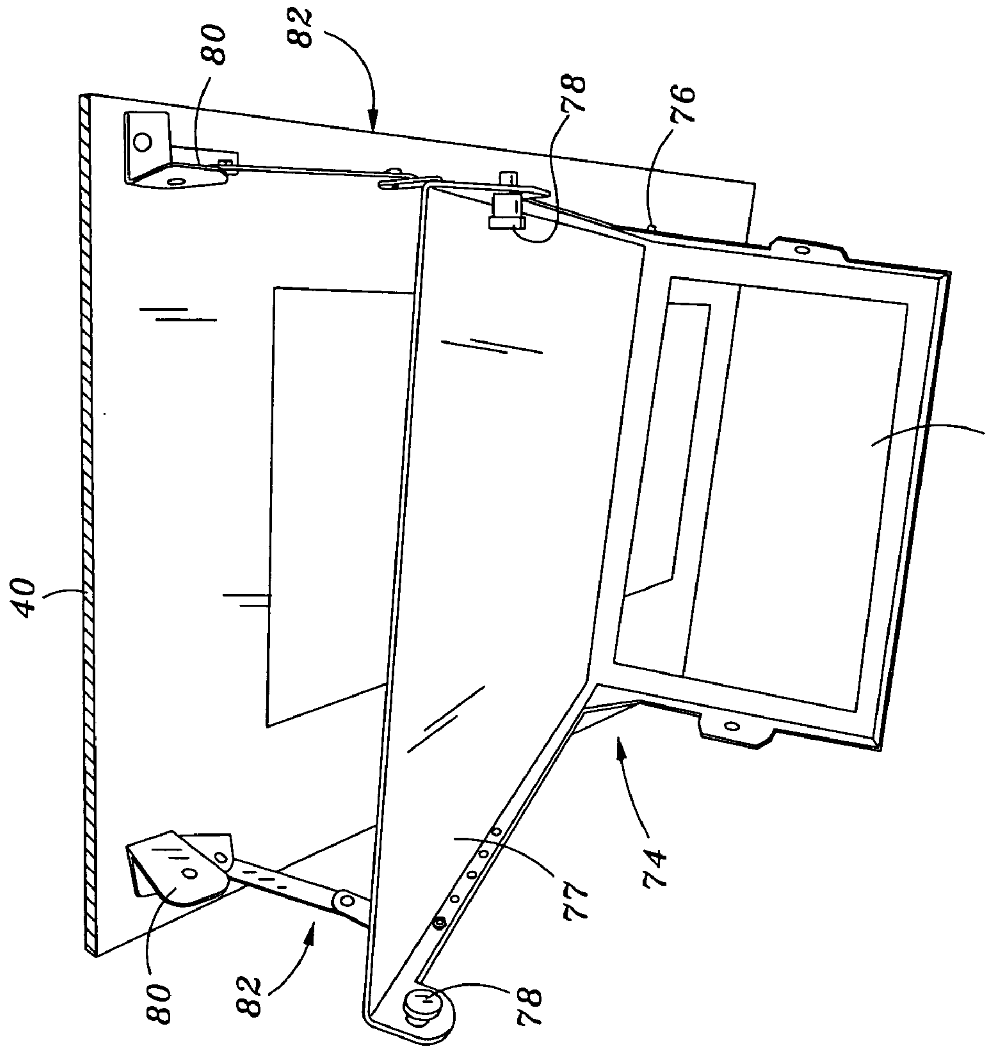
FIG. 6 illustrates the controller platform of FIG. 5 in a second position.
Figure 5:
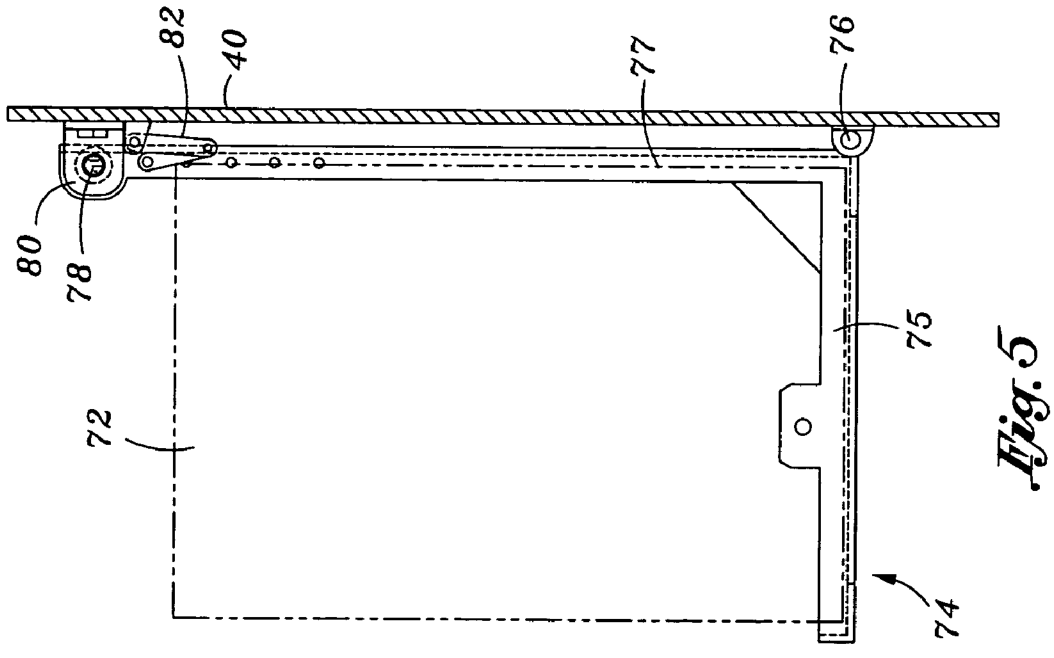
FIG. 5 illustrates a controller platform in accordance with an embodiment of the invention, the platform illustrated in a first position.

In one embodiment, the game controller 72 is mounted for movement between a stationary position and a removal position. FIGS. 5 and 6 illustrate a controller platform 74 for moving the gaming controller 72.

In one embodiment, the controller platform 74 comprises a generally "L"-shaped tray. The platform 74 has a generally planar base 75 and a generally vertically extending side wall 77. In one embodiment, the base 75 has the form of a generally rectangular supporting frame, so as to be lightweight. The base 75 may be of a solid construction. As illustrated, the base 75 may include one or more flanges or mount points for screws or the like which may be connected to a game controller 72 to secure the game controller 72 to the base.

Means are provided for moving the platform 74 from its first to its second position. As illustrated, the platform 74 is mounted to the rear wall 40 of the cabinet 22 with a pair of pins 76 (only one of which is visible in FIGS. 5 and 6). The pins 76 extend generally horizontally outward from each side of the platform 74 at either side thereof. In one embodiment, the pins 76 are mounted for rotation relative to the rear wall 40.

Means are also provided for maintaining the platform 74 in its first position. As illustrated, a pair of pins 78 are located at a top of the platform 74, the pins 78 extending from a top portion of the vertically extending portion of the platform 74.

In one embodiment, each pin 78 is biased outwardly into a position in which it engages a flange 80 extending from the rear wall 40 of the gaming machine 20. In one embodiment, a spring (not shown) biases each pin 78 outwardly. When properly aligned, the pins 78 are preferably biased outwardly and engage an opening in each flange 80.

The pins 78 may be moved inwardly out of engagement with the flanges 80. When the pins 78 are in this position, the platform 74 may be rotated forward away from the rear wall 40 of the cabinet 20.

In one embodiment, means are provided for limiting the amount of rotation of the platform 74 and maintaining the platform 74 in its second position. As illustrated in FIG. 6, in one embodiment an arm 82 limits the movement of the platform 74. The arm 82 comprises a multi-link member extending between the rear wall 40 and the platform 74. The arm 82, including the links thereof, is permitted to rotate in a vertically extending plane with respect to both the rear wall 40 and platform 74. As illustrated, when the platform 74 is rotated outwardly, the arm 82 rotates outwardly, eventually stopping the movement of the platform 74.

Referring to FIG. 5, when the platform 74 is in the first position, the platform 74 presents a generally planar surface upon which the gaming controller 72 may securely rest. When the platform 74 is rotated to its second position, as illustrated in FIG. 6, the gaming controller 72 is tilted into a position in which it is generally aligned with the display opening in the console 30. So aligned, the gaming controller 72 may easily be accessed, including for removal from the cabinet 22.

Figure 1:
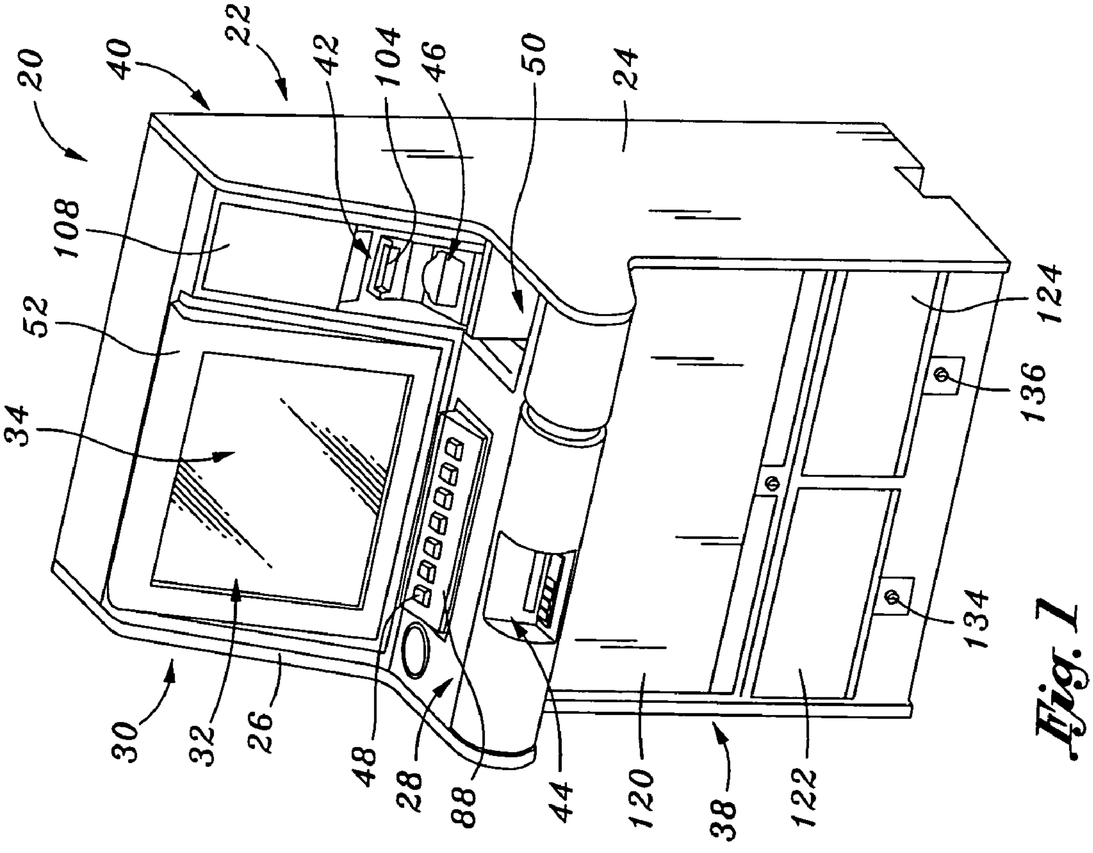
FIG. 1 is a perspective view of a gaming machine in accordance with one embodiment of the invention, a display, bezel, bill validator cover and access panels thereof shown in a first position.

Referring to FIGS. 1 and 2, the player tracking device 44 is preferably located at a front portion of the outwardly extending play area 28. As illustrated, a bumper 86 is located at the front of the play surface 28. The bumper 86 may be constructed of foam or the like so as to be cushioned.

In a preferred embodiment, one or more components of the player tracking device 44 are located in the bumper 86. As illustrated, a recessed area is formed in the bumper 86. In one embodiment, the recessed area has a generally planar bottom portion and a generally vertically extending rear wall. The card reader of the player tracking device 44 is preferably located in the vertically extending rear wall portion. In one embodiment, the keypad of the player tracking device 44 is located on the generally planar bottom portion. The player tracking device 44 may include various other components, such as a controller which may be located within the interior of the cabinet 22.

As described above, one or more input buttons or other input devices 48 are provided. In one embodiment, the input buttons 48 are mounted to a button support 88. As illustrated, the button support 88 is located at or one the surface defined by the play area 28. In a preferred embodiment, the button support 88 is mounted for movement relative to the cabinet 22, including the play surface 28.

Figure 7:
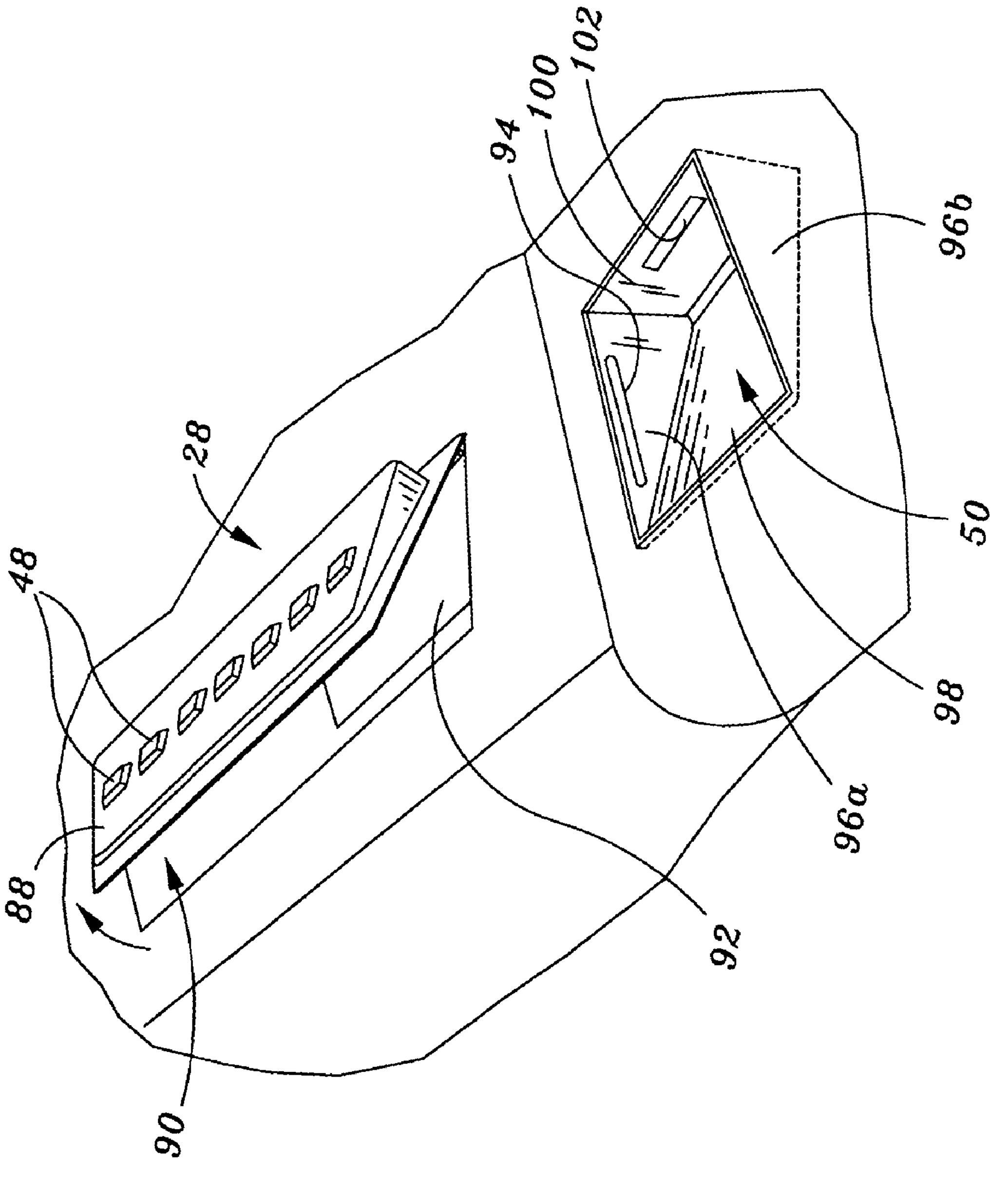
FIG. 7 illustrates a button mount and coin tray of the invention, the button mount in a second, raised position.

In one embodiment, the button support 88 is hingedly mounted to the cabinet 22, permitting the button support 88 to be moved from a position in which the button support 88 is resting upon the cabinet 22, to a position in which it is raised upwardly. When the button support 88 is raised upwardly, as illustrated in FIGS. 2 and 7, an access opening 90 is exposed. The opening 90 leads through the play surface 28 into the interior of the cabinet 22.

For ergonomic reasons, a top surface of the button support 88 is preferably slanted or angled from the horizontal. In one embodiment, the top surface of the button support 88 is raised upwardly from a base portion of the button support 88. In this configuration, a bottom side of the top surface of the button support 88 is set upwardly. Bottom portions of the buttons 88 are located at this bottom side, and are accessible when the button support 88 is raised upwardly. In this manner, lamps used to illuminate the buttons may be accessed, in the manner described in U.S. Pat. No. 6,590,176 incorporated herein by reference.

As described above, the gaming machine 20 includes a printer for printing tickets, coupons or the like, a coin dispenser, as well as a bill validator 42. In one embodiment, printed tickets and coins are preferably both dispensed into the coin tray 50. In one configuration, the ticket printer 92 is, as illustrated in FIG. 7, positioned within the interior of the cabinet 22 below the button support 88. When the button support 88 is raised upwardly, the ticket printer 92 is accessible through the access opening 90.

The ticket printer 92 is mounted in alignment with a ticket slot 94 in the coin tray 50. As illustrated, the tray 50 is inset or recessed into the play surface 28. In one embodiment, the coin tray 50 is, along with the bill validator, located to one side of the cabinet 22, as illustrated in FIGS. 1 and 2.

Referring to FIG. 7 again, the coin tray 50 has a pair of opposing side walls *96a,b*. These walls *96a,b* extend generally parallel to the sides or walls 24,26 of the cabinet 22. The ticket slot 94 is located in the side wall *96a* of the coin tray 50 located closest to the button support 88. An output of the ticket printer 92 is aligned with this slot 94.

The coin tray 50 also has a bottom 98 and end wall 100. The bottom 98 preferably slopes downwardly from a front edge of the tray 50 towards the end wall 100. As illustrated, the front edge of the tray 50 is located near the bumper 84.

A coin slot 102 is located in the end wall 100 of the coin tray 50. Coins which are dispensed by the coin dispensing mechanism pass through the coin slot 102 into the coin tray 50.

Referring to FIGS. 1 and 2, as described briefly above, the bill validator 42 includes a bill slot 104. The bill slot 104 accepts bills for reading by the validator (not shown) and, if validated, for deposit into a cash box 106. In one embodiment, the cash box 106 is positioned in the console 30. A cover 108 extends over the cash box 106.

In one embodiment, cover 108 is hinged at a lower edge thereof to the cabinet 22. The cover 108 may be moved from a first position in which it extends over the cash box 106 to a second position in which it is rotated forward toward the coin tray 50. The cover 108 preferably has an opening therein which is aligned with the bill slot 104 when the cover 108 is in its first position.

The cash box 106 is removably located in a compartment above the bill slot 104. The cash box 106 is configured to be removed by gripping a handle 110 and pulling the cash box 106 outwardly from the console 30.

In one embodiment, as also illustrated in FIG. 2, a security door 112 is located behind the cover 108, and in front of the cash box 106. The security door 112 is preferably hingedly mounted to the console 30 and includes a lock permitting the door 112 to be secured in a closed position. In the closed position, the door 112 encloses the compartment containing the cash box 106, preventing removal of the cash box.

In one embodiment, a security mechanism is associated with the cover 108. In one embodiment, a display glass is mounted in the cover 108, and a corresponding light reflector is associated with the security door 112.

As described above, the cabinet 22 defines a storage area 38 which is generally a part of the interior of the cabinet, but is primarily located under the play surface 28. As illustrated in FIG. 2, in one embodiment access to the storage area 38 is provided via a first access door 120, second access door 122 and a third access door 124. In one embodiment, the storage area 38 is generally divided into an upper compartment 126 and two lower compartments 128*a,b* by one or more panels or walls.

As illustrated, in one embodiment a coin hopper and coin delivery mechanism 130 are located in the first compartment 130. The coin hopper and coin delivery mechanism 130 are located beneath the coin tray 50 and coin acceptor 46. Appropriate coin delivery pathways are provided between the coin acceptor 46 and the hopper, and the hopper/delivery mechanism and the coin slot 102.

In a preferred embodiment, access to the first compartment is provided through the first access door 120. The first access door 120 is mounted for movement between a closed position in and a raised, open position. In a preferred embodiment, the first access door 120 is mounted in a manner permitting a lower edge thereof to be rotated upwardly and outwardly, as illustrated in FIG. 2.

Various items, including unprinted tickets, coins, bills and the like may be stored in the two lower compartments 128*a,b*. In one embodiment, access to the first lower compartment 128*a* is via the second access door 122. Access to the second lower compartment 128*b* is via the third access door 124. In one embodiment, the second and third access doors 126,128 are mounted for movement between open and closed positions in similar fashion to the first access door.

Preferably, all of the access doors 120, 122, 124 may be locked in their closed position, preventing access to the storage area 38. In one embodiment, a rotating cam type lock 132 is mounted to the first access door 120. When rotated into a first position, a cam of this lock 132 engages a flange or slot associated with the cabinet 22, preventing forward movement of the lower portion of the first access door 122.

In one embodiment, a rotating cam type lock 134 is associated with the cabinet 22 for engaging the second access door 124. When rotated into a first position, a cam of this lock 134 engages a flange or slot associated with the second access door 124, preventing its forward movement. A similar lock 136 is preferably provided relative to the third access door 124.

The gaming machine 20 may include other features. In one embodiment, a cup holder 138 is provided. As illustrated in FIG. 2, the cup holder 138 comprises a recessed area in the play area 28.

The gaming machine 20 and the various features thereof have a variety of advantages. A number of these features and advantages will now be described.

The location of the player tracking device 44, and more particularly the card reader and keypad thereof, is particularly advantageous. First, the card reader is located close to the player when the player is seated for game play. In many instances, a player may attached their card to a cord, bracelet, neck chain or the like. The location of the card reader allows a user to place their card in the reader without having to remove their card from the cord or chain. The location of the card reader also avoids the player having to reach across the gaming machine 20 to reach the console 30 or other remote location.

Another advantage is that the card reader and keypad are positioned between the player and the gaming machine 20 when the player is seated at the gaming machine. This positioning makes it difficult for another person to see the card reader and keypad, protecting the player's information. For example, the player may be required to input a PIN or other code with the keypad in order to utilize their card. The player's PIN is protected because the keypad is shielded from view because of its location behind the player.

In a preferred embodiment, as illustrated in FIG. 2, the bezel 52 and button support 88 are sized and positioned so that when the bezel 52 is moved to its second position, the buttons 48 are accessible through the opening in the bezel. This configuration has substantial benefits when trouble-shooting, testing or repairing the gaming machine 20. In particular, during testing it is frequently necessary to access the game controller. The technician must then also use the input buttons to trigger actions and view the display in order to see the output being displayed by the game controller. However, when the game controller is accessed, the buttons and other features of the gaming machine are generally inaccessible. For example, in an "upright" style gaming machine, the button are generally mounted on the exterior of the door. The game controlled is accessed by opening the door, which then causes the buttons to be positioned on the back side of the opened door, far from the controller.

In accordance with the invention, the game controller 72 is conveniently accessible by rotating the bezel 52 and display 34 forward. So positioned, the technician can access the game controller 72, and at the same time operate the buttons 38 and view the display 34. In particular, the technician can reach through the opening in the bezel 52 and reach each and every button 38. In addition, the display 34 is positioned at an angle which still permits viewing by the technician.

Another advantage of this configuration is that no components need to be disconnected in order to access and test or trouble-shoot the game controller 72. In many instances, the display must be completely removed from the gaming cabinet in order to access the controller there behind. In accordance with the present invention, access is provided via the movable display mounting.

The folding configuration of the access doors has a number of advantages. Because the access doors fold into the cabinet 22 when open, ease of access to the storage area 38 is substantially improved. A frequent problem with side-opening doors is that when open they pose a hazard, either being damaged when they are impacted by other items (such as people, change carts or the like) or cause injury (such as when a person's leg hits them). These risks of damage and injury are eliminated with this door configuration.

The controller platform 74 accommodates gaming controllers having a variety of different configurations, including sizes and shapes. This allows the gaming machine 20 to accept any of a plurality of different gaming controllers for customizing the gaming machine.

Advantageously, the configuration of the gaming machine permits the machine to have a slant top configuration but at the same time have substantially reduced dimensions compared to other slant type gaming machines. In one embodiment, the configuration permits the depth of the machine (from the front of the bumper to the rear wall) to be less than the depth of the machine (from side-to-side) in a similar fashion to gaming machines disclosed in U.S. patent application Ser. No. 10/253,151, now U.S. Pat. No. 6,860,814. In one embodiment, the gaming machine is about twenty-six (26) inches in depth and about twenty-eight (28) inches in width.

The total height of the gaming machine is also minimized. In the prior art, top boxed had to be used to associate either player tracking devices or receipt printers with these types of gaming machines due to space limitations. In accordance with the gaming machine as configured, the coin and bill acceptors are located to one side of the machine, the receipt printer is mounted under the play area, and the card reader and key pad are located at the bumper, all within the compact space of the cabinet itself. In one embodiment, the gaming machine is about 40-44 inches in height.

In one embodiment, a coin elevator is used to transport coins from the coin hopper to the coin tray. Preferably, this elevator is stationary, while the coin hopper is movable.

Of course, other configurations of the gaming machine are contemplated. For example, the gaming machine 20 may include multiple displays. A first display and a second display may be mounted side-by-side (i.e. next to one another) or top-to-bottom (i.e. above and below). In this manner varying information my be displayed to a player at the same time. For example, player-specific game information (such as a bingo card) may be displayed on one display while general game results information (such as drawn balls) may be displayed on the other display. In one embodiment, the multiple displays may all be associated with the console 30. In another embodiment, one or more displays could be associated with a top box mounted upon the top of the console.

In one embodiment, the bezel may be connected to the display, such as the frame thereof. In this manner, the bezel may move with the display. In another embodiment, a lock may be associated with the bezel for selectively locking the bezel in its first position against the cabinet. This prevents, for example, a player from opening the bezel and then either removing or moving the display (such as to gain access to the gaming controller).

In one embodiment, the display may be movably mounted with one or more hinges. The embodiment described above has the particular advantage that the display may easily be moved or completely removed, simply by sliding the pins from the slots. Of course, the display may be mounted for movement in other fashions as well, including so that it swings open to one side, or via a scissor type extender or the like. Preferably, the means for mounting simply permits the display to move between a first position in which it generally covers or obscures the opening in the console during normal use, and permit access to the opening at other times.

Likewise, the button panel may be mounted for movement in other ways. In one embodiment, the button panel may be completely removable. The button panel may include a lock or release mechanism to prevent a player from moving the button panel to a position in which the opening thereunder is accessible.

As described above, various features of the invention may be applied to gaming machines having other configurations. For example, the rotating or "flip down" bezel and display configuration may be applied to an upright gaming machine, such as of the type illustrated in U.S. patent application Ser. No. 10/621,742 incorporated herein in its entirety by reference. That application illustrates an upright type gaming machine in which a display is mounted to a door thereof. In accordance with the invention, the display of the upright gaming machine may be mounted for rotation relative to the door, permitting access to the interior of the gaming machine through an opening in the door at which the display is mounted. Of course, the display may be mounted behind a bezel which moves separately or with the display.

In addition, the movable display configuration may be applied to such an upright gaming machine configuration where the display is mounted to the cabinet behind the door. As described above, upright gaming machine generally include a large front door which may be opened to provide access to the interior of the gaming machine. In one embodiment, a display may be mounted to the cabinet in a position aligned with an opening in the door when the door is closed. In this manner, the display may display game data for viewing by a player through the opening in the door. So configured, various components, such as a gaming controller, may be located within an interior space of the cabinet behind the display. As such, the display may be movably mounted in a manner described herein, permitting the display to be moved into a position in which the space behind the display is accessible.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A gaming machine comprising:

a cabinet defining an interior space, said cabinet having a base portion, a play area and a console portion, said play area located between said base portion and said console portion, said play area extending forwardly beyond said base portion, said console portion extending upwardly from said play area, said console area having a stationary front face having an access opening therein;

a display mounted to said cabinet for movement between a first position in which said display is located at said access opening and closes said access opening and access to said interior space of said cabinet is prevented through said access opening, and a second position in which at least a portion of said display is positioned outwardly of said access opening whereby an interior area of said cabinet is accessible through said access opening; and a bezel defining a display opening, said bezel having a top portion and a bottom portion, said bottom portion mounted to said console portion of said cabinet for rotational movement about a horizontal axis relative to said front face of said console portion between a closed position in which, when said display is in said first position, said bezel is positioned over said display with said display viewable through said display opening and in which said bezel prevents movement of said display to said second position, and an open position in which said top portion of said bezel is rotated forwardly away from said front face of said console portion about said horizontal axis, wherein access to said interior portion of said cabinet through said access opening is prevented by said display, but said bezel in said open position permitting said display to be rotated to said second position, providing access to said interior of said cabinet.

2. The gaming machine in accordance with claim 1 wherein said cabinet has a generally vertically extending rear surface and said front face slopes rearwardly towards said rear surface, and including a controller platform mounted to said rear surface of said cabinet at least partially behind said access opening in said front face, said controller platform rotatable from a first position in which a base portion of said controller platform is generally horizontal to a second position in which said base portion of said controller platform tilts forwardly away from said rear surface towards said rearwardly sloping front face.

3. The gaming machine in accordance with claim 1 wherein said display has a top edge, a bottom edge and a pair of opposing edges which are positioned adjacent portions of said front face of said console portion of said cabinet when said display is in said first position.

4. The gaming machine in accordance with claim 1 wherein a plurality of player input buttons are mounted to said play area in front of said bezel and display, said player input buttons positioned so that when said bezel is rotated to said open position, said bezel extends over said player input buttons with said display opening in said bezel aligned over said player input button, permitting actuation of said player input buttons through said display opening.

5. A gaming machine comprising:

a cabinet defining an interior space, said cabinet having a base portion, a play area and a console portion, said play area located between said base portion and said console portion, said play area extending forwardly beyond said base portion, said console portion extending upwardly from said play area, said console area having a front face having an access opening therein;

a display having a pair of opposing sides, a first pair of pins extending outwardly from said opposing sides and a second pair of pins extending outwardly from said opposing sides, said first pair of pins positioned above said second pair of pins, said first pair of pins each selectively engaging slots in a first pair of mounts positioned at opposing sides of said opening in said console portion and said second pair of pins each selectively engaging slots in a second pair of mounts positioned at opposing sides of said opening in said console, said first and second pairs of pins when engaging said slots in said first and second pairs of mounts positioning said display at said access opening in said console portion generally closing said access opening, said first and second pairs of pins when disengaged from said slots in said first and second pairs of mounts disengaging said display from said cabinet, and said first pair of pins when disengaged from said first pair of mounts while said second pair of pins remains engaged with said second pair of mounts permitting said display to be rotated about said second pair of pins about a horizontal axis to a position in which at least a portion of said display is positioned outwardly of said access opening; and a bezel defining a display opening, said bezel mounted to said cabinet for movement between a closed position in which, when said display is in said first position, said bezel is positioned over said display with said display viewable through said display opening and in which said bezel prevents movement of said display to said second position, and an open position in which said bezel is rotated away from said front face of said console portion and said display blocks said access opening unless said display is rotated to said second position, providing access to said interior of said cabinet.

6. The gaming machine in accordance with claim 5 including a controller platform located in said interior space, said gaming controller mounted to said controller platform, said controller platform mounted for movement.

7. The gaming machine in accordance with claim 6 wherein said controller platform is mounted for movement between a first position in which a base portion of said controller platform supporting said gaming controller is generally horizontal and a second position in which said base portion of said controller platform is tilted forwardly towards said access opening in said console portion.

8. The gaming machine in accordance with claim 5 including a stop limiting forward rotation of said display to its second position.

9. The gaming machine in accordance with claim 5 wherein a plurality of player input buttons are mounted to said play area in front of said bezel and display, said player input buttons positioned so that when said bezel is rotated to said open position, said bezel extends over said player input buttons with said display opening in said bezel aligned over said player input button, permitting actuation of said player input buttons through said display opening.

10. The gaming machine in accordance with claim 5 wherein each of said pins engages a slot having an open end which permits said pin to be removably inserted into and out of said slot.

* * * * *

UNITED STATES PATENT AND TRADEMARK OFFICE
CERTIFICATE OF CORRECTION

PATENT NO. : 7,267,613 B2
APPLICATION NO. : 10/661853
DATED : September 11, 2007
INVENTOR(S) : Joseph W. Cole It is certified that error appears in the above-identified patent and that said Letters Patent is hereby corrected as shown below:

At column 12, line 3, delete "10/621,724" and insert --10/621,740--

Signed and Sealed this

Fourth Day of December, 2007

JON W. DUDAS
*Director of the United States Patent and Trademark Office*